(12) United States Patent
Fan et al.

(10) Patent No.: US 8,977,968 B2
(45) Date of Patent: Mar. 10, 2015

(54) PSEUDO-REMOTE TERMINAL IOTA MOBILE DIAGNOSTICS AND ELECTRONIC CUSTOMER CARE

(75) Inventors: Guoxin Fan, Plano, TX (US); Sudheer Kumar Peddireddy, Garland, TX (US); Vani Budhati, Garland, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 403 days.

(21) Appl. No.: 11/468,145

(22) Filed: Aug. 29, 2006

(65) Prior Publication Data

US 2008/0057914 A1 Mar. 6, 2008

(51) Int. Cl.
  *G06F 3/00* (2006.01)
  *H04W 24/06* (2009.01)
  *H04W 88/02* (2009.01)

(52) U.S. Cl.
  CPC .............. *H04W 24/06* (2013.01); *H04W 88/02* (2013.01)
  USPC ............ 715/740; 455/423; 455/424; 455/425

(58) Field of Classification Search
  USPC .................................... 715/740; 455/423–425
  See application file for complete search history.

(56) References Cited

U.S. PATENT DOCUMENTS

| 5,283,861 | A * | 2/1994 | Dangler et al. ................ 715/740 |
| 5,805,666 | A * | 9/1998 | Ishizuka et al. .............. 379/1.01 |
| 6,321,287 | B1 | 11/2001 | Rao et al. |
| 6,556,208 | B1 | 4/2003 | Congdon et al. |
| 6,687,499 | B1 * | 2/2004 | Numminen et al. .......... 455/423 |
| 7,450,936 | B2 * | 11/2008 | Kim .............................. 455/418 |
| 7,512,402 | B2 * | 3/2009 | Narayanaswami et al. ... 455/420 |
| 2001/0006891 | A1 | 7/2001 | Cho |
| 2002/0000990 | A1 | 1/2002 | Schauser |
| 2003/0003907 | A1 * | 1/2003 | Lai et al. ....................... 455/425 |
| 2003/0032408 | A1 | 2/2003 | Jennings |
| 2003/0234809 | A1 * | 12/2003 | Parker et al. .................. 345/740 |
| 2005/0114504 | A1 * | 5/2005 | Marolia et al. ................ 709/224 |
| 2005/0228847 | A1 * | 10/2005 | Hayes, Jr. ..................... 709/200 |
| 2006/0003810 | A1 * | 1/2006 | Saikyo et al. ................. 455/566 |
| 2006/0111131 | A1 * | 5/2006 | Shin et al. ..................... 455/466 |
| 2006/0179118 | A1 * | 8/2006 | Stirbu .......................... 709/217 |
| 2006/0190608 | A1 | 8/2006 | Sahinoja et al. |

(Continued)

FOREIGN PATENT DOCUMENTS

CN  1345520 A  4/2002
CN  1780334 A  5/2006

(Continued)

OTHER PUBLICATIONS

Office Action dated Aug. 10, 2010 in connection with Japanese Patent Application No. 2007-222824.

(Continued)

*Primary Examiner* — Amy Ng
*Assistant Examiner* — Meseker Takele

(57) ABSTRACT

A system is provided that includes a portable electronic device and a customer care system. The customer care system is configured to remotely communicate with the portable electronic device. The customer care system is operable to receive an indication of content displayed on a display of the portable electronic device. The customer care system is operable to communicate a signal to the portable electronic device that the portable electronic device interprets as input to keys on the portable electronic device by a user of the portable electronic device.

18 Claims, 6 Drawing Sheets

(56) References Cited

U.S. PATENT DOCUMENTS

| | | | |
|---|---|---|---|
| 2006/0200814 A1* | 9/2006 | Kontinen et al. | 717/168 |
| 2006/0217115 A1* | 9/2006 | Cassett et al. | 455/423 |
| 2006/0230312 A1* | 10/2006 | Nichols et al. | 714/25 |
| 2007/0169093 A1* | 7/2007 | Logan et al. | 717/168 |
| 2007/0207800 A1* | 9/2007 | Daley et al. | 455/425 |
| 2008/0139195 A1* | 6/2008 | Marsyla et al. | 455/423 |

FOREIGN PATENT DOCUMENTS

| | | |
|---|---|---|
| JP | 8237188 A | 9/1996 |
| JP | 2001-230725 | 8/2001 |
| JP | 2002543495 A | 12/2002 |
| JP | 2003-060766 | 2/2003 |
| JP | 2006-148933 | 6/2006 |
| JP | 2006-197299 | 7/2006 |
| KR | 10-1999-0047323 | 7/1999 |
| KR | 10-2003-0096695 | 12/2003 |
| KR | 10-2004-0086137 A | 10/2004 |
| WO | WO 00/65464 A1 | 11/2000 |

OTHER PUBLICATIONS

European Search Report dated Apr. 5, 2011 in connection with European Patent Application No. EP 07 11 5228.
Translated Examination Report dated Aug. 29, 2013 in connection with Korean Patent Application No. 10-2007-0086687; 13 pages.
Translated Examination Report dated Aug. 22, 2014 in connection with Korean Patent Application No. 10-2007-0086687; 13 pages.

* cited by examiner

US 8,977,968 B2

PSEUDO-REMOTE TERMINAL IOTA MOBILE DIAGNOSTICS AND ELECTRONIC CUSTOMER CARE

CROSS-REFERENCE TO RELATED APPLICATIONS

None.

BACKGROUND

With an increasing desire for information to be accessible anywhere at any time, an increasing number of portable electronic devices are emerging, especially with wireless communication capabilities. With each new generation of devices, new features and complexity are added. Due to the added complexity of devices an increasing burden has been placed on customer care support to effectively and efficiently debug, configure, and manage the portable electronic devices in order to meet the needs and desires of users of the portable electronic devices.

When a user has a problem with the operation of a portable electronic device, they call a customer care number for the portable electronic device. Once connected with a customer care representative (CCR), the user will communicate the nature of their problem to the CCR and receive instructions accordingly. The process of the CCR describing the actions a user may need to take in order to debug, configure, and manage the portable electronic device is a difficult, error prone, and lengthy process, especially if the user is not familiar or comfortable with operating electronic devices. The process of the CCR describing the actions a user may need to take may also be difficult to communicate to users if there are new or complex features of the portable electronic device.

SUMMARY

In one embodiment, a system is provided that includes a portable electronic device and a customer care system. The customer care system is configured to remotely communicate with the portable electronic device. The customer care system is operable to receive an indication of content displayed on a display of the portable electronic device. The customer care system is operable to communicate a signal to the portable electronic device that the portable electronic device interprets as input to keys on the portable electronic device by a user of the portable electron device.

In another embodiment, a mobile handset is provided. The mobile handset includes a component, a display, and a processor. The component is operable to promote communications with a customer care system. The display is operable to display content information. The processor processes some inputs from the customer care system as if it were user input from mobile handset keypad inputs. The processor is further operable to promote providing the customer care system with the content information displayed on the mobile handset display.

In another embodiment, a method is provided for remotely diagnosing a mobile handset. The method includes interpreting some commands received by the mobile handset from a customer care system as inputs by a user of the mobile handset. The method includes obtaining information related to information displayed on a display of the mobile handset, and providing the information related to the displayed information to the customer care system.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
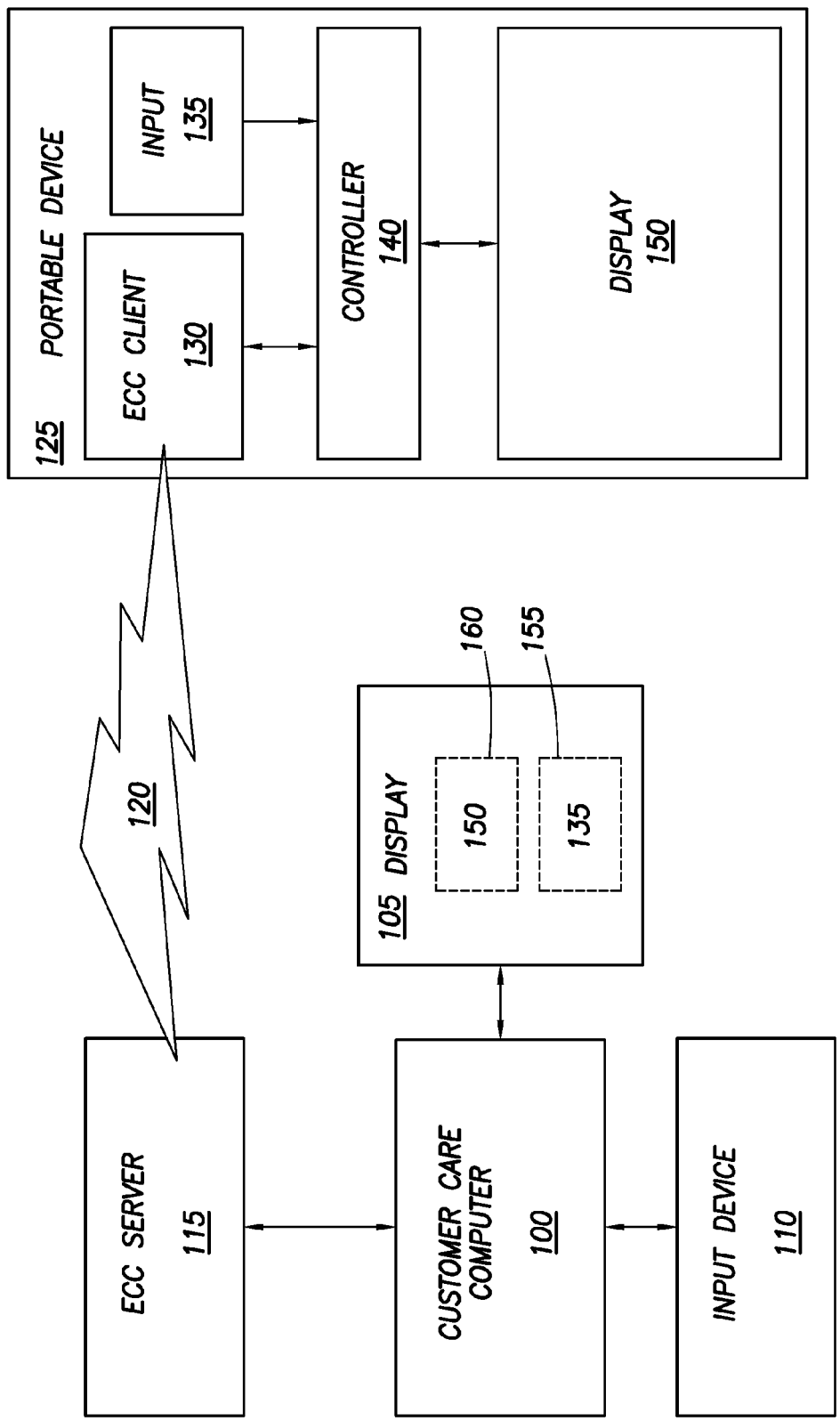
FIG. 1. depicts a system according to one embodiment of the present disclosure for controlling a portable electronic device from a customer care computer.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein but may be modified within the scope of the appended claims along with their full scope of equivalents.

In one embodiment, it is desirable for a customer care representative (CCR) to be able to control activity on a portable electronic device (PED) and see the results of the activity to more easily debug, configure, and manage the PED. Seeing and controlling the activity on a PED enables a CCR to complete their tasks without relying on a users understanding or ability to perform the tasks needed to debug, configure, and manage the PED. This flexibility increases the productivity of the CCR and the burden placed on customer care support to effectively and efficiently debug, configure, and manage portable electronic devices is reduced.

Remote terminal applications, such as X-Windows Terminal (XTERM) or virtual network connection (VCN), are useful tools for CCR's when assisting users with desktop or laptop computers. PED's such as a cellular phone, personal data assistant (PDA), portable gaming device, etc., may not have sufficient resources, such as storage capacity, memory, and processing power, needed to implement these applications. Because the PED has limited resources and for profitability reasons, it may be impractical to increase the resources of the PED to support such applications since it would increase costs. Further, it is desirable to make PED's as small as possible to promote their portability. By increasing the resources on a PED to be able to implement an XTERM or VCN application, the size may also increase.

According to one embodiment, the present disclosure provides an application that is able to be implemented using the relatively meager resources of the PED to enable a CCR to see and control any activity on a PED. The application may be implemented using software, hardware, firmware, and/or combination thereof on the PED. The application may utilize some communication systems that already exist on the PED to receive inputs from a customer care computer and implement them on the PED as if they were inputs received from the various inputs of the PED itself. For example, a remote customer care computer may send signals to the PED that may be interpreted as a keystroke entered by a user of the PED. Further, the application may use the communication systems to send a copy of the contents of the PED display to the customer care computer in order for the CCR to see what is being displayed on the PED. Alternatively, an index indicating the screen that is currently being displayed may be sent to the customer care computer. Therefore the application enables a CCR to remotely control and see activities on the PED as if the CCR were physically using the PED themselves. The above described application, which might also be referred to as a pseudo-remote terminal application, enables the functionality to emulate a remote terminal application's ability for a CCR to see and control activity on a remote device. The application achieves the functionality obtained by PC's via XTERM or VCN without requiring the resources to run such a resource intensive remote terminal application on the PED.

FIG. 1 depicts an exemplary system for enabling a CCR to see and control activity on a PED. As shown in FIG. 1, a customer care computer (CCC) 100 has a display 105 that displays the operations of the CCC 100 and an input device 110 for allowing the CCR to manipulate the operations of the CCC 100. Input device 110 may be a keyboard, mouse, or any other user input device. The CCR may in some embodiments connect the CCC 100 with the PED 125 though an electronic customer care (ECC) server 115 over a communication medium 120. Communication medium 120 may be a wired, wireless networks, the Internet, optical, audio or any other known communication mediums or systems.

The PED 125 includes an input 135 for allowing a user to manipulate the operations of the PED 125. The input 135 may be any one or a combination of a keypad, touch screen, scrollbar, stylus, microphone, etc. Note that input 135 may also be an external device connected to PED 125 such as a full sized keyboard, etc. The manipulations of input 135 are communicated to a controller 140 for controlling the operation of the PED 125. Controller 140 may be implemented in software, firmware, hardware, or any combination of these. The operation and current state of the PED 125 are communicated to the user through a display 150. Controller 140 outputs display items indicating the operation and current state of the PED 125 to the display 150. Display 150 may be a liquid crystal display (LCD), a cathode ray tube (CRT) display, an external display, etc.

PED 125 also includes an ECC client 130 for communicating with the ECC server 115. Communication between the ECC server 115 and the ECC client 130 may occur through the use of any standard communication protocol. In the case of communication medium 120 being a wireless medium, the Open Mobile Alliance Device Management (OMA-DM) protocol may be used. This would enable an Internet-Over-The-Air Mobile Diagnostics and Electronic Customer Care (IOTA-MD/ECC) solution to be implemented. Commands may be sent to the PED 125 using any standard programming languages such as Java or protocols such as HTTP.

Note that the ECC client 130 may be implemented using components that are already incorporated into any PED 125 which provides for communication with external devices. For example, if the PED 125 is configured to communicate with external devices via a wired connection, such as through a serial port or network cable, then the ECC client 130 may be implemented using the components which enable the PED 125 to communicate through the wired connection. Similarly, if the PED 125 is configured to communicate via a wireless connection, such as through cellular networks, then the ECC client 130 may be implemented using the components which enable the PED 125 to communicate through the wireless connection. Therefore, in some cases, no new system resources need to be added to the PED 125 to implement the ECC client 130 for communicating with an external device such as the EEC server 115 or the CCC 100.

Figure 2:
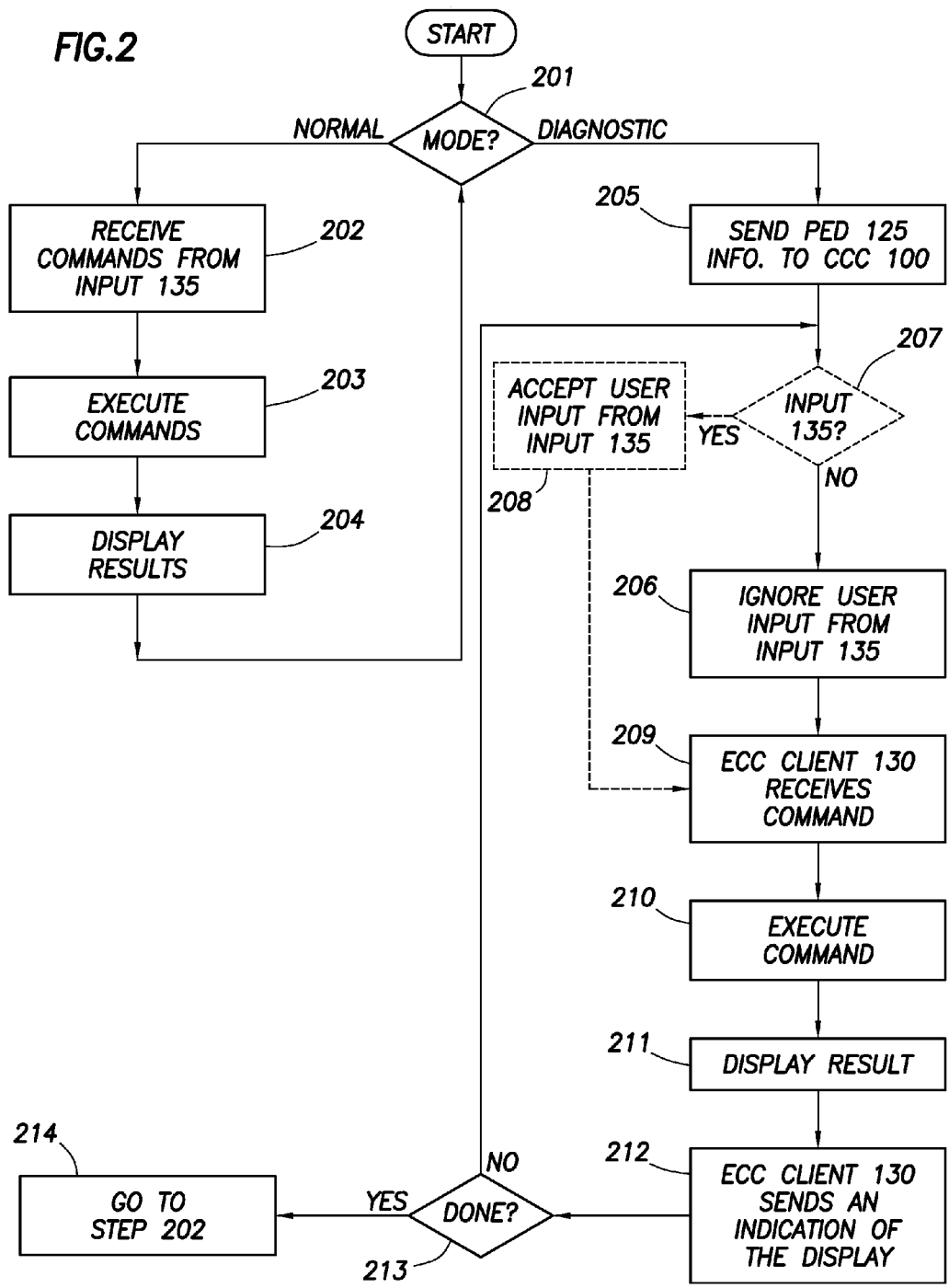
FIG. 2 depicts a flowchart according to one embodiment of the present disclosure of the operation of the PED 125.

The operation of the PED 125 is described with respect to FIG. 2. Block 201 determines whether the PED 125 is to operate in a normal mode or a diagnostic mode of operation. This may be accomplished by determining whether or not an instruction has been received from the CCC 100 for the PED 125 to operate in a diagnostic mode of operation. If the PED 125 is to operate in a normal mode of operation, then at block 202 the PED 125 receives a command from a user via input 135. At block 203, the controller 140 may interpret the input 135 and execute the command. At block 204, the results of the execution of the command are displayed on display 150. The process returns to block 201.

If at block 201 the PED 125 is to operate in a diagnostic mode of operation, then at block 205 the PED 125 sends information corresponding to the PED 125 to the CCC 100. The information may include the Original Equipment Manufacturer (OEM) number, a model number, a software version number, a hardware version number, and a current state of the PED 125. At block 206, the input 135 manipulated by the user may be ignored in order to prevent the user from interfering with any operations being performed by a CCR. Alternatively, a determination may be made, at block 207, as to whether or not to accept a user's manipulation of input 135. This may allow the user to enter information at block 208, such as a name or address, to the PED 125. At block 209, the ECC client 130 receives a command from the CCC 100. The ECC client 130 may then forward the command to the controller 140 for the PED 125 to execute the command in block 210. Alternatively, at block 209, the ECC client 130 may receive a command and transform it into a format for the controller 140 to execute the command in block 210. In either alternative, the command is executed by controller 140 as if were a command received through input 135, such as via a keypad on the PED 125.

At block 211, the result of the command is displayed on display 150. At block 212, an indication of the contents of the display are sent to the ECC client 130 to be communicated to the CCC 100 through the ECC server 115. This may be accomplished by the controller 140 copying the contents of the display 150, such as from a display buffer or other memory area or location, and sending the copy to the ECC client 130.

Alternatively, the ECC client 130 itself may directly access the display 150 to send a copy of the contents to the CCC 100 through the ECC server 115. It is noted that, in either case, the contents of the display may be compressed by either the controller 140 or the ECC client 130 or both in order to reduce the bandwidth requirement to communicate the contents of the display 150.

In a further alternative, the controller 140 may send an index to the CCC 100 through the ECC server 115 indicating which screen graphical user interface (GUI), or other information is being displayed on display 150. The PED 125 may include a finite number of views that may be presented on the display 150, and a unique index may be associated with each of the views. The index may include reference numbers, characters, or codes, for example. Each of the views may be of a particular screen, window, menu, etc. By communicating an index corresponding to the contents of the display, only the index number may need to be communicated rather than an entire image. In still another alternative, the PED 125 may indicate which screen is being displayed on display 150 by simply communicating to the CCC 100 a confirmation of receiving and processing a command. The CCC 100 may then use static user interface mapping or other techniques to determine the contents displayed on display 150 as described in detail below.

At block 213, a determination is made as to whether or not the CCC 100 has indicated that the PED 125 is to return to the normal mode of operation. The process returns to one of blocks 206 or 207 in the diagnostic mode, otherwise block 214 transfers the PED 125 to block 202 in the normal mode of operation.

Figure 3:
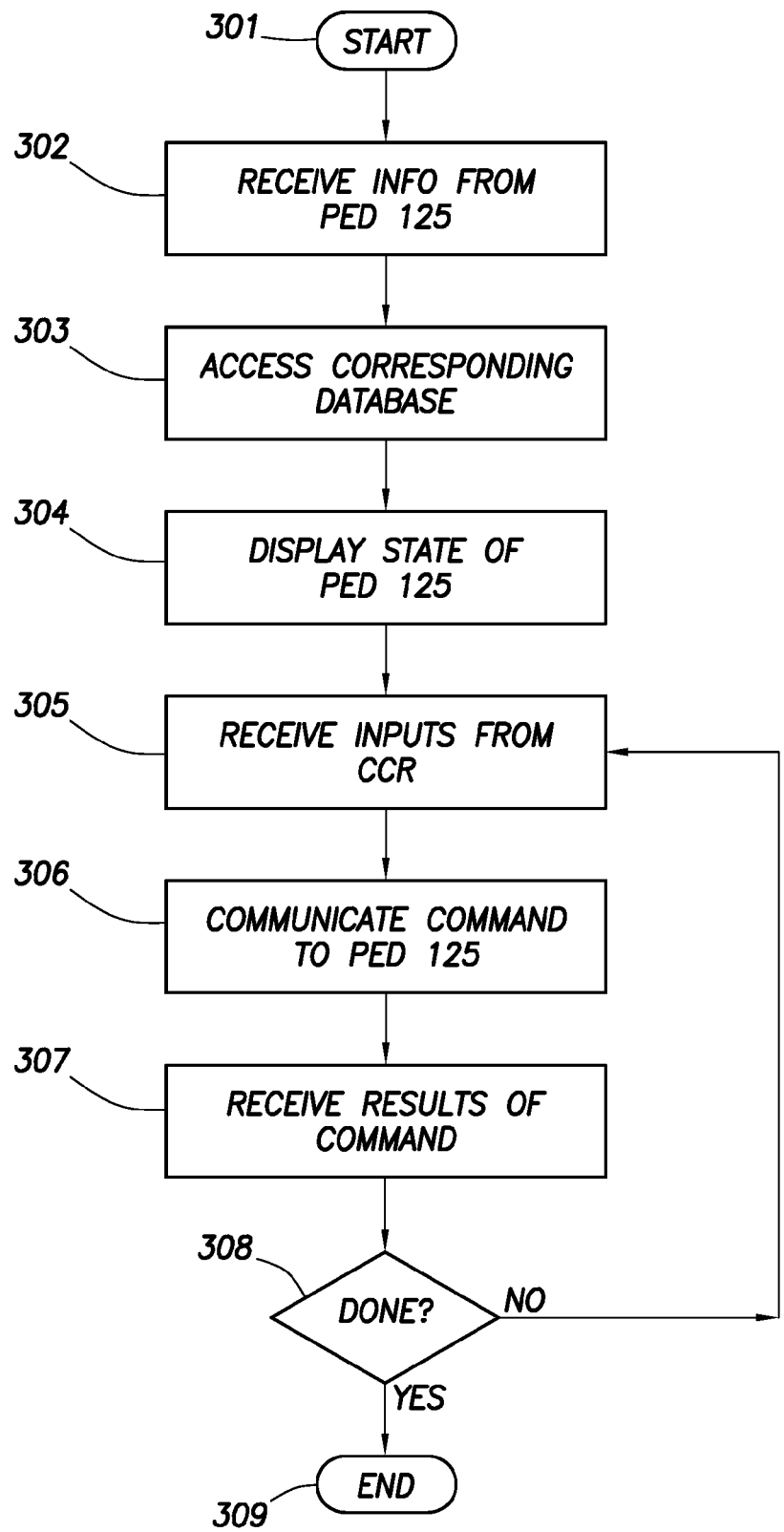
FIG. 3 depicts a flowchart according to one embodiment of the present disclosure of the operation of the CCC 100.

The operation of the CCC 100 is described with respect to FIG. 3. At block 301, the CCR instructs the CCC 100 to connect to the PED 125 and instructs the PED 125 to operate in a diagnostic mode of operation. At block 302, the CCC 100 receives the information corresponding to the PED 125. The information allows the CCR to access a database (not shown) that may be provided on CCC 100 or the ECC server 115, the database corresponds to the PED 125 at block 303. The database may include information such as menu trees for following the operational path of the PED 125, as well as indexed images corresponding to each screen or menu in the operational path. The database may also include information on input schemes of the PED 125, troubleshooting and diagnostic tasks to be completed by a CCR, or any other information useful to the CCR so as to allow them to debug, configure, and manage the PED 125.

Upon receiving the information from the database, the CCC 100 may display the current state of the PED 125, at block 304. This may be accomplished by displaying a window 160 (see FIG. 1) showing the contents of the display 150 of the PED 125. Based on the state of the PED 125 and the desires and/or needs of the user, the CCR may then input commands to the CCC 100, at block 305. The commands may be communicated from the CCC 100 to the PED 125 through the ECC server 115 to control the operation of the PED 125, at block 306. The commands are interpreted as input that the PED 125 would have received from input 135, such as, for example, normal user input from a keypad on the PED 125. Upon receiving the commands, the PED 125 behaves as if the CCR were physically manipulating the input 135 of the PED 125.

The commands may be input to the CCC 100 by the CCR manipulating a displayed input window 155 (see FIG. 1) showing a visual representation of the various inputs 135 of the PED 125. For example, input window 155 may show a representation of a keypad used as input 135 on the PED 125. Upon the CCR manipulating or selecting a visual representation, for example of a key on a keypad of the PED 125, the CCC 100 signals the PED 125 via the controller 140 which interprets the command as if it had come from the input 135.

Alternatively, the commands may be input to the CCC 100 from the CCR by the CCR inputting commands into a command line application running on the CCC 100. The command line application running on the CCC 100 may then provide each command in a format for the controller 140 to interpret the command as if it had come from the input 135. While two examples of how the commands are input to the CCC 100 are described above, the commands may be input by the CCR to the CCC 100 in any way so long as the commands are able to be interpreted, transformed, and/or received in a manner that the controller 140 is able to interpret the command as if it had come from the input 135 or otherwise. Note that the interpretation and transformation of the command may be accomplished by any of the CCC 100, the EEC client 130, or the controller 140, or otherwise.

At block 307, when the PED 125 has completed executing the command, results may be provided to the display 150. The content of the display 150 is sent to the CCC 100 and displayed on display 105 in one or a combination of a number of different ways. One technique for the results of the operation to be seen by the CCR is for the controller 140 to, for example, obtain data from the display buffer or send a copy of the contents of the display 150 in any suitable image format, such as a bitmap image, to the CCC 100. In any event, the CCR is able to see an image corresponding to what is displayed on the PED 125.

Alternatively, the PED 125 may send a screen index number to the CCC 100 indicating which screen is current being display upon the completion of each command. Also a combination of the PED 125 sending a screen index number and the PED 125 sending a screenshot corresponding to allow portions of the contents displayed on the PED 125 may be used. For example, if a given display screen shows the contents of settings on the PED 125, then a screenshot showing an image corresponding to the contents of display 150 may be beneficial since many problems a user has with a PED 125 may result from incorrectly changing settings of the PED 125. On the other hand, if a given display screen is a nonchangeable menu list then the screen index number may simply be sent to the CCC 100.

In another embodiment, the results of the command may be seen at the CCC 100 through static user interface mapping. Static user interface mapping may be accomplished by communicating the menu tree(s) and the corresponding views of the PED 125 from the database to the CCC 100. Upon the CCC 100 receiving a confirmation from the PED 125 that a command has been received and processed, the corresponding view in the process path of the menu tree(s) may be displayed. The PED 125 only communicating a confirmation of receiving and processing a command may further reduce the amount of data that the PED 125 communicates to the CCC 100.

At block 308, a determination is made as to whether or not the CCR is finished controlling the PED 125. If not then blocks 305-308 are repeated. If the CCR is finished controlling the PED 125, then an indication is sent to the PED 125 to return to the normal mode of operation.

Note that while the above description is made with the CCR performing each of the blocks themselves, a test script may also be used to input a series of commands to the PED 125. Further, a hardware diagnostics script may also be loaded into the controller 140 to ensure that the PED 125 hardware is working as desired. Further, while FIG. 1 only illustrates one CCC 100 and one PED 125 there may be multiple instances of each.

The system shown in FIG. 1 enables a pseudo-remote terminal application to be implemented on a PED 125 in order to let a CCR remotely control the PED 125 and see the results without any user involvement. This application may be implemented on a low/medium-end PED 125 with insufficient resources to run remote terminal applications such as XTERM. Further, the application may use standardized communication protocols and existing communication equipment on the PED 125 so that no new resources need to be added to the PED 125 to implement the pseudo-remote terminal application.

Figure 4:
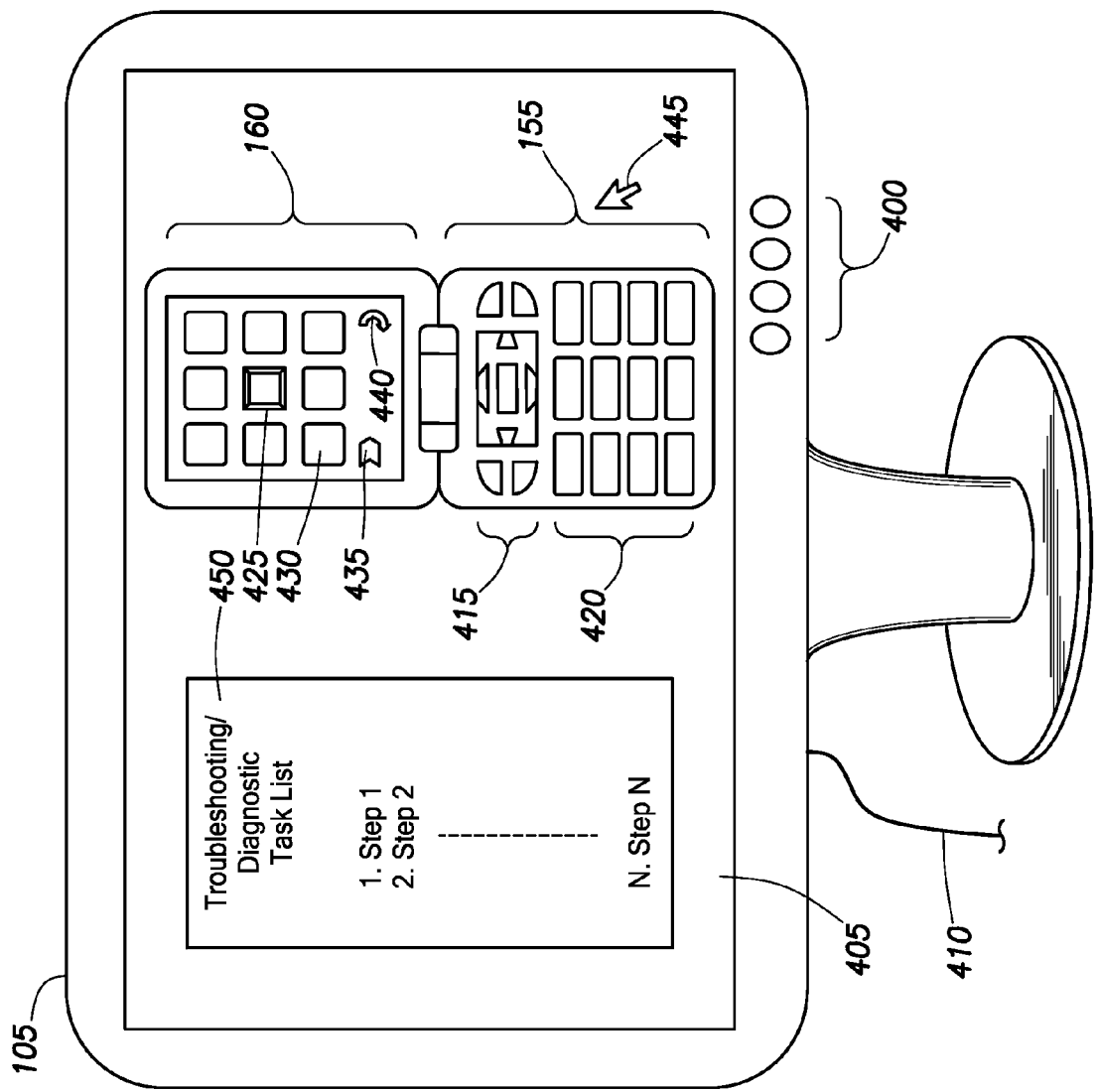
FIG. 4 depicts one embodiment of the present disclosure of the display of information corresponding to a portable electronic device by a customer care computer.

FIG. 4 depicts an example of the contents received from the PED 125 being displayed on display 105. As shown in FIG. 4, display 105 includes a set of controls 400 for controlling display settings such as brightness, contrast, etc., and a display area 405 for displaying the content input from the CCC 100 through input line 410. In the example shown in FIG. 4 the PED 125 is a cell phone and a visual representation of the cell phone is displayed in display area 405. The visual representation includes the input window 155 and the display window 160. The input window 155 shows the bottom half of the cell phone and includes functional buttons 415 and a standard telephone keypad 420. Functional buttons 415 may include various selection buttons, a directional pad, or any other functional buttons present on PED 125.

The display window 160 shows the contents of display 150 on PED 125. In the example shown in FIG. 4 the display window 160 shows the top half of the mobile phone which may include a display with various menu icons 430. A currently selected menu icon is distinguished through a highlight 425 or any other distinguishing mark. Also displayed is a menu navigation icon 435 corresponding to a functional button 415 for moving forward with the currently selected menu icon 445. Similarly, a menu navigation icon 440 is displayed corresponding to a functional button 415 for moving back to the previously displayed menu screen. Note that the menu navigation icons 435 and 440 may also display text such as "Menu", "Next", "Prev", "Back", or any other appropriate text. Also note that a combination of icons and text may be used for various menu screens.

The visual representation of the PED 125 may be controlled in the same way that the physical PED 125 would be, except instead of the CCR using their hands to manipulate the PED 125, the CCR would use a control icon 445, such as a mouse cursor to manipulate the visual representation of input 135 in input window 155. Note that the display area 405 may be touch sensitive in which case the CCR may physically manipulate the screen by touching the visual representation of input 135. A window 450 may also be displayed on display 105 to show a CCR a troubleshooting and/or diagnostic task list to assist the CCR in troubleshooting the PED 125. While the example shown in FIG. 4 depicts a mobile phone, the PED 125 may be any portable electronic device such as a personal data assistant (PDA), portable gaming device, etc. While the above example showed a two-dimensional representation of the PED 125, it is noted that a three-dimensional representation of the PED 125 may be used in order to enable a CCR to have full access to other features and functions of the PED 125. For example, any inputs 135 not present on a front face of the PED 125 may become accessible, for example, by rotating the image of the mobile phone on the display 105. A volume control on the side of the PED 125 might be an example of such input.

Figure 5:
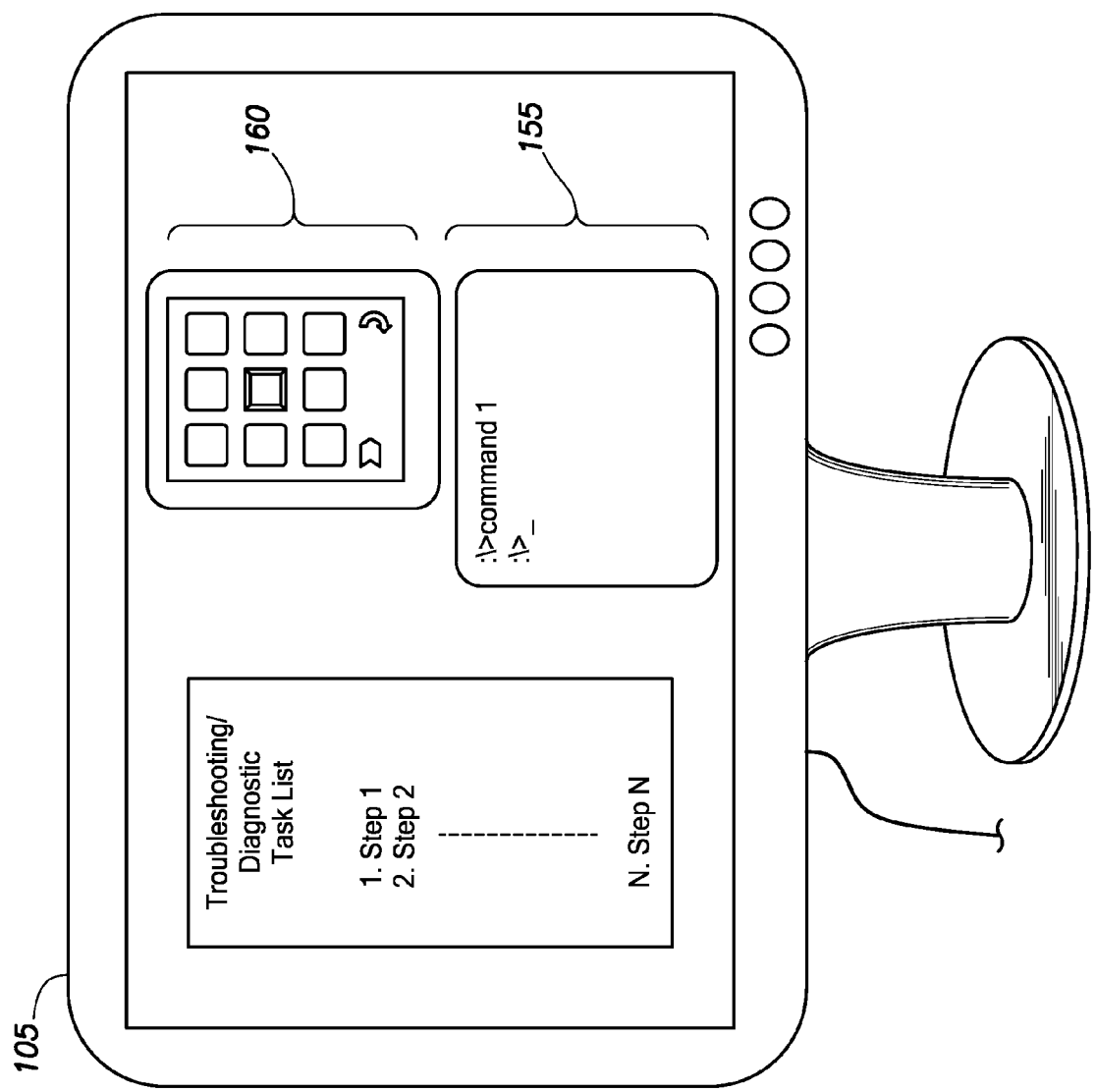
FIG. 5 depicts another embodiment of the present disclosure of the display of information corresponding to a portable electronic device by a customer care computer.

Alternatively, as shown in FIG. 5 the input window 155 may be a command line window for allowing the CCR to input commands to the CCC 100. The CCR may input the commands as text strings or otherwise using the input device 110 such as a keyboard.

Disclosed above is an implementation of a pseudo-remote terminal application which enables a CCR to remotely control the PED 125 and see the results without any user involvement. The pseudo-remote terminal application may be implemented using standardized communication protocols and existing communication systems on the PED 125. This enables the pseudo-remote terminal application to be implemented on low/medium-end PED's.

It will be appreciated that the functionality on the PED 125 to receive signals from the CCC 100 and promote processing these signals as if they were user input may be provided by the EEC client 130, controller 140, or other systems or combinations thereof. Similarly the PED 125 may display information obtained, for example, from a display buffer or other memory location to provide to the CCC 100. The display information may be obtained or directed by the EEC client 130, controller 140, or other systems or combinations of systems on the PED 125.

Figure 6:
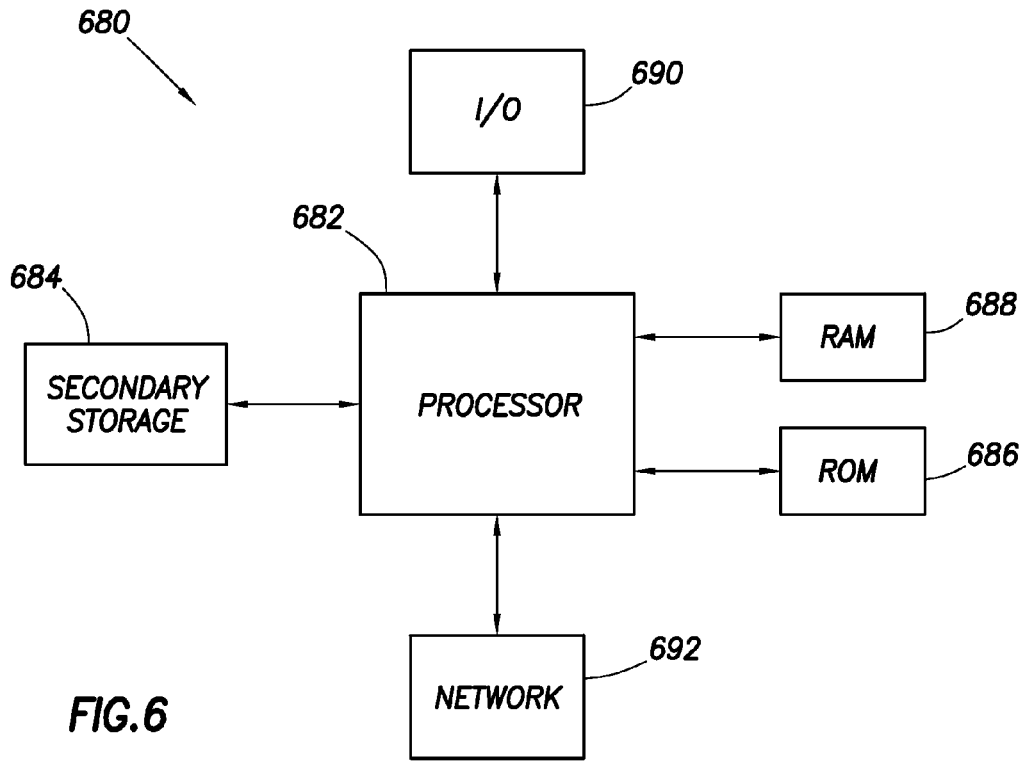
FIG. 6 depicts an exemplary general purpose computer system suitable for implementing several embodiments of the disclosure.

The CCC 100 described above may be implemented on any general-purpose computer with sufficient processing power, memory resources, and network throughput capability to handle the workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for nonvolatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method blocks. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

Figure 7:
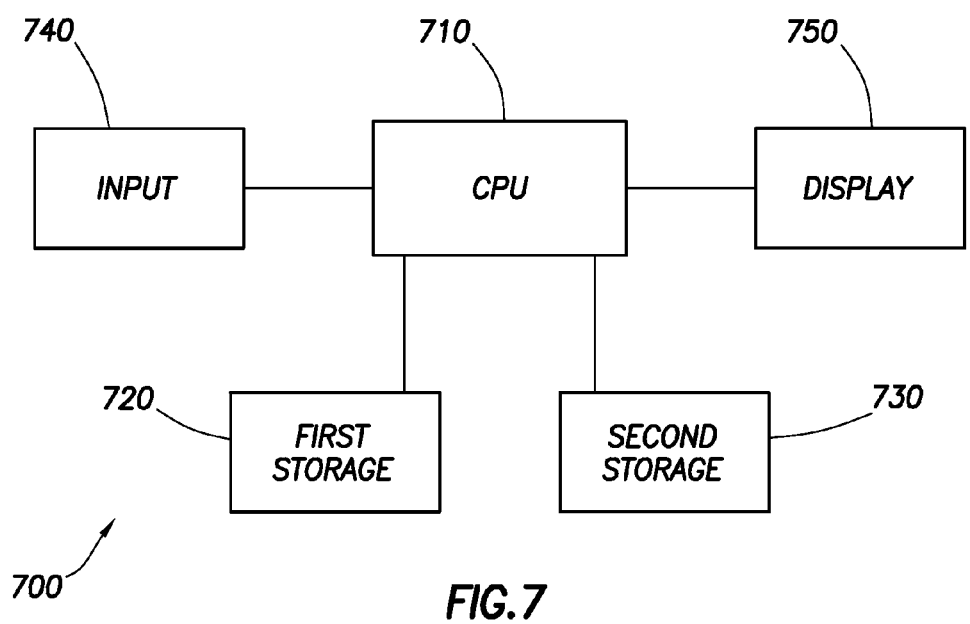
FIG. 7 depicts an exemplary portable electronic device suitable for implementing several embodiments of the disclosure.

The PED system described above may be implemented on any hand-held mobile electronic device or mobile handset 700 such as is well known to those skilled in the art. An exemplary mobile handset 700 for implementing one or more embodiments disclosed herein is illustrated in FIG. 7. The mobile handset 700 includes a processor 710 (which may be referred to as a central processor unit or CPU) that is coupled to a first storage area 720, a second storage area 730, an input device 740 such as a keypad, and an output device such as a display screen 750.

The processor 710 may be implemented as one or more CPU chips and may execute instructions, codes, computer programs, or scripts that it accesses from the first storage area 720 or the second storage area 730. The first storage area 720 might be a non-volatile memory such as flash memory. A container and other mobile handset 700 data would typically be installed in the first storage area 720. The second storage area 730 might be firmware or a similar type of memory. The runtime engine and the device's operating system would typically be installed in the second storage area 730.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system comprising: a processor; a customer care system configured to: remotely communicate with a portable electronic device using Open Mobile Alliance Device Management (OMA-DM) protocol, receive an indication of content displayed on a display of the portable electronic device through the OMA-DM protocol, communicate an input signal to the portable electronic device through the OMA-DM protocol such that the portable electronic device interprets the input signal as one or more user interface inputs, determine whether to allow a user input to the portable electronic device to be performed by the portable electronic device in response to identifying the user input while the customer care system is remotely communicating with the portable electronic device, and allow the user input to be performed by the portable electronic device while the customer care system is remotely communicating with the portable electronic device and the portable electronic device is operating in a diagnostic mode in response to a determination to allow the user input, and identify, in response to sending a command to the portable electronic device for the portable electronic device to perform, a user interface presently displayed on the portable electronic device from a menu tree and views of the portable electronic device corresponding to elements in the menu tree, the menu tree and the corresponding views stored in a database for the customer care system, wherein the user interface presently displayed on the portable electronic device is identified based on a mapping between the menu tree and a corresponding view of the portable electronic device for having performed the command.

2. The system of claim 1, further comprising a display coupled to the customer care system that is configured to display a view corresponding to the content displayed on the portable electronic device.

3. The system of claim 1, wherein the customer care system is further configured to send an instruction to the portable electronic device for the portable electronic device to operate in the diagnostic mode and control a test script to input a series of commands to the portable electronic device when the portable electronic device is operating in the diagnostic mode.

4. The system of claim 1, wherein the indication comprises a current screenshot image of the display of the portable electronic device when the display of portable electronic device corresponds to a user-changeable interface.

5. The system of claim 1, wherein the indication comprises a screen index from the portable electronic device that corresponds to one of a plurality of views for the display of the portable electronic device that are stored in the customer care system.

6. The system of claim 1, wherein the customer care system is further configured to receive information related to an image on the display of the portable electronic device from a video buffer on the portable electric device.

7. A mobile handset comprising:
a component configured to promote communications with a customer care system using Open Mobile Alliance Device Management (OMA-DM) protocol;
a display configured to display content information; and
a processor configured to:
process inputs received through the OMA-DM protocol from the customer care system as user input from mobile handset keypad inputs,
send data related to the content information displayed on the mobile handset display through the OMA-DM protocol, determine whether to allow a user input to the mobile handset to be performed by the mobile handset based on the inputs received from the customer care system in response to identifying the user input while the mobile handset is remotely communicating with the customer care system, allow the user input to be performed by the mobile handset while the mobile handset is remotely communicating with the customer care system and operating in a diagnostic mode in response to a determination to allow the user input, and perform a command received from the customer care system, wherein the customer care system is configured to identify a user interface presently displayed on the display as a result of the processor performing the command from a menu tree and views of the mobile handset corresponding to elements in the menu tree, the menu tree and the corresponding views stored in a database for the customer care system, and wherein the user interface presently displayed on the display is identified based on a mapping between the menu tree and a corresponding view of the mobile handset for having performed the command.

8. The mobile handset of claim 7, wherein the data comprises a current screenshot of the display when the display of portable electronic device corresponds to a user-changeable interface.

9. The mobile handset of claim 7, wherein the data comprises a screen index when the content information on the display corresponds to a non-changeable interface, and the screen index corresponds to one of a plurality of views for the display of the mobile handset that are stored in the customer care system.

10. The mobile handset of claim 7, wherein the processor is configured to send current display buffer information associated with the content information to the customer care system.

11. The mobile handset of claim 7, wherein:
the component is further configured to receive an instruction to the mobile handset for the mobile handset to operate in the diagnostic mode; and
the processor is further configured to process a test script to input a series of commands when the mobile handset is operating in the diagnostic mode.

12. A method in a customer care system for remotely diagnosing a mobile device, the method comprising:
establishing a communication session with the mobile device using Open Mobile Alliance Device Management (OMA-DM) protocol;
communicating an input signal to the mobile device through the OMA-DM protocol, the input signal comprising one or more user interface inputs for the mobile device;
determining whether to allow a user input to the mobile device to be performed by the mobile device in response to identifying the user input while the customer care system is remotely communicating with the mobile device;
allowing the user input to be performed by the mobile device while the customer care system is remotely communicating with the mobile device and the mobile device is operating in a diagnostic mode in response to a determination to allow the user input;
receiving information from the mobile device through the OMA-DM protocol, the information related to content displayed on the mobile device; and
identifying, in response to sending a command to the mobile device for the mobile device to perform, a user interface presently displayed on the mobile device from a menu tree and views of the portable electronic device corresponding to elements in the menu tree, the menu tree and the corresponding views stored in a database for the customer care system,
wherein the user interface presently displayed on the portable electronic device is identified based on a mapping between the menu tree and a corresponding view of the mobile device for having performed the command.

13. The method of claim 12, further comprising:
displaying a view that represents the content displayed on the mobile device based on the information received from the mobile device.

14. The method of claim 12, further comprising:
receiving the information related to content displayed on the mobile device when the content displayed on the mobile device changes.

15. The method of claim 12, further comprising:
sending an instruction to the mobile device for the mobile device to operate in the diagnostic mode; and
controlling a test script to input a series of commands to the mobile device when the mobile device is operating in the diagnostic mode.

16. The method of claim 12, further comprising:
displaying an image related to the keypad of the mobile device;
selecting one or more of the keys on the image of the keypad displayed on the customer care system;
communicating each key selected on the image of the keypad as the input signal to the mobile device.

17. The method of claim 12, wherein:
the information related to the content displayed on the mobile device comprises a screen index from the mobile device that corresponds to one of a plurality of views for the mobile device that are stored in the customer care system.

18. The method of claim 12, wherein the information related to the content displayed on the mobile device comprises data from a video buffer of the mobile device.

* * * * *